Patented Jan. 17, 1928.

1,656,883

UNITED STATES PATENT OFFICE.

WALTHER CLAASEN, OF COLOGNE-ON-THE-RHINE, GERMANY.

PROCESS FOR THE PRODUCTION OF ESTER MIXTURES.

No Drawing. Application filed March 7, 1927, Serial No. 173,611, and in Austria January 29, 1927.

This invention relates to an improvement in or modification of the process claimed in my copending patent application Nr. 95469.

The said copending patent application has for its object the production of ester mixtures, using crude cresols as a primary material.

Further investigations have shown that the process described in the copending patent application No. 95,469 can also be applied to carbolic acid with the same advantages as are obtained with the former process. It was unknown and also not to be expected that it would be possible to obtain new, commercially valuable products by using the entire acid mixture obtainable by oxidation from a primary material consisting of the hydrogenated phenol, which is in itself expensive.

Similarly as in the case of the copending patent application, the feature of the invention is not the utilization of any definite ester isolated from the acid mixture, but the esterification of all the acids which can possibly form as a result of the oxidation process.

The surprising discovery has been made that the mixture of adipic acid and its lower homologues, such as for example glutaric acid and succinic acid, obtained by one of the usual oxidation processes from hydrogenated carbolic acid, after having been esterified with aliphatic, aromatic or cyclic alcohols, without being separated into its components, possesses properties which make it highly suitable for various technical purposes.

On the other hand it is very easily possible to separate the one or other acid, for instance the adipic acid or succinic acid from the said mixture and utilize it for other technical purposes. It is therefore possible to subject to the same treatment, extremely pure hydrogenated carbolic acid, which has been carefully freed from homologues in the usual way. This was not to be expected, because the large yield of lower homologues of adipic acid, obtained by the oxidation process, is entirely useless for instance for purposes in connection with food condiments and the like, (as substitute for tartaric acid in the acids contained in baking powders) for which pure adipic acid can be used, and these lower homologues have also not hitherto been employed for any other technical purposes. However, if for instance the adipic acid is separated from the acid mixture, the remainder of the mixture can be used at once as a highly valuable camphor substitute. As all the reaction products are made use of, the high cost of the primary material is of no importance.

In comparison with the process forming the subject matter of the copending patent, this process has the further economic importance that it is possible to isolate valuable constituents of the mixture, namely valuable acids, and use them separately later on, without involving any detrimental properties for the ester mixture treated according to the process of the present application.

*Examples.*

(1) 100 g. of the cyclohexanol formed by catalytic hydrogenation from phenol are dropped into 684 g. boiling nitric acid of the density 1.2. After the reaction has ended, evaporation is carried out and the remaining mixture of the various acids is dissolved in three times the amount by weight of ethyl alcohol, which has been mixed beforehand with 3% gaseous hydrochloric acid. After boiling in a reflux condenser for several hours, the mixture is poured into water, separated in the separating funnel and the ester washed with a dilute soda solution for the purpose of separating the acid ester formed at the same time. The esters consist of a colourless liquid having a slight smell. The boiling point is 124–150° C. at 15 mm. pressure.

(2) The methyl cyclohexyl esters obtained in a similar manner by the esterification of the acid mixtures by means of cyclic alcohols, for instance methyl cyclohexanols. The hydrogenation product of crude cresols consists of a viscous oil having a not unpleasant smell.

(3) The components are made to react according to the methods indicated in Example 1. The liquid is then concentrated to such an extent that upon cooling crystals are precipitated. The crystalline masses which consist of pure adpic acid, are sucked off. The filtrate is then evaporated—preferably in a vacuum—and the residue esterified in a known manner with methanol. The boiling point of the ester mixtures from the "residue acids" is 124–135° C. at 15 mm. pressure.

(4) If the methods indicated in Example 3 are adopted, that is to say if after the oxidation process has ended, the liquid is concentrated until crystals are precipitated, then upon cooling, the acid with the lowest solubility—the adipic acid—separates out first, and is isolated. This can be employed for instance as a baking powder acid as substitute for tartaric acid. Its cost of production is favourably influenced by the use of all the other acids obtainable with the process in question.

If after separating the adipic acid, the solution is concentrated to a further extent, upon re-cooling, the succinic acid is precipitated from the solution, this being obtained in a sufficiently pure state for certain technical purposes, for instance for artificial resin.

75 g. adipic acid are obtained from 100 g. cyclohexanol. The adipic acid can be completely purified by re-crystallization from hot water with the addition of animal charcoal.

The yield of succinic acid is about 20 g. The filtrate can be worked up separately or can be added to a new charge.

Having now particularly described and ascertained the nature of my said invention and in what manner the same is to be performed, I declare that what I claim is:—

1. Process for making esters from mixtures of the acids of the adipic-acid series, which comprises oxidizing a hydrogenated phenol to form mixtures of the acids of the adipic-acid series, and then esterifying the resulting acid mixture without previously separating the mixture into its components.

2. Process for making esters of organic acid mixtures, which comprises oxidizing hexahydro phenol to form mixtures of acids of the adipic-acid series, cooling and crystallizing the mixture to separate out desired acids and then esterifying the rest of the remaining acid mixture.

In testimony whereof I have signed my name to this specification.

Dr. WALTHER CLAASEN.